US012785475B2

(12) United States Patent
Ferrara et al.

(10) Patent No.: US 12,785,475 B2
(45) Date of Patent: Nov. 3, 2026

(54) ROTOR FOR A ROTARY ELECTRIC MACHINE WITH END DISCS WITH PROGRESSIVELY DECREASING AXIAL DISTANCE IN BETWEEN

(71) Applicant: FERRARI S.P.A., Modena (IT)

(72) Inventors: Davide Ferrara, Modena (IT); Paolo Faverzani, Modena (IT); Luca Poggio, Modena (IT)

(73) Assignee: FERRARI S.P.A., Modena (IT)

( * ) Notice: Subject to any disclaimer, the term of this patent is extended or adjusted under 35 U.S.C. 154(b) by 199 days.

(21) Appl. No.: 18/664,940

(22) Filed: May 15, 2024

(65) Prior Publication Data

US 2024/0388150 A1 Nov. 21, 2024

(30) Foreign Application Priority Data

May 18, 2023 (IT) ........................ 102023000010020

(51) Int. Cl.

*H02K 1/27* (2022.01)
*H02K 1/2783* (2022.01)
*H02K 7/00* (2006.01)

(52) U.S. Cl.

CPC ........... *H02K 1/2783* (2022.01); *H02K 7/003* (2013.01); *H02K 2213/09* (2013.01)

(58) Field of Classification Search

CPC .......... H02K 1/2783; H02K 1/28; H02K 1/04; H02K 17/165; H02K 7/003; H02K 2213/09

See application file for complete search history.

(56) References Cited

U.S. PATENT DOCUMENTS

| | | | | | |
|---|---|---|---|---|---|
| 4,729,160 | A * | 3/1988 | Brown | .................. | H02K 15/03 310/156.28 |
| 5,126,610 | A * | 6/1992 | Fremerey | ................. | D01H 4/12 310/90 |
| 10,897,179 | B2 * | 1/2021 | Magri | .................. | H02K 1/2766 |
| 11,794,123 | B1 * | 10/2023 | Zhang | .................... | A63H 29/22 |
| 12,334,779 | B2 * | 6/2025 | Sasaki | .................. | H02K 1/2733 |
| 12,494,687 | B2 * | 12/2025 | Coppola | .................. | H02K 1/28 |

(Continued)

FOREIGN PATENT DOCUMENTS

| | | | |
|---|---|---|---|
| DE | 4107602 | A1 | 9/1992 |
| EP | 4135164 | A1 | 2/2023 |

OTHER PUBLICATIONS

Italian Search Report for Application No. 202300010020; Filing Date: May 18, 2023; Date of Mailing: Nov. 16, 2023; 6 pages.

*Primary Examiner* — Maged M Almawri
(74) *Attorney, Agent, or Firm* — CANTOR COLBURN LLP

(57) ABSTRACT

A rotor for a rotary electric machine and having: a support cylinder, which has an outer surface and a central cavity; a plurality of permanent magnets, which are axially oriented, rest on the outer surface of the support cylinder and are arranged beside one another around a rotation axis to form a closed ring; and two end discs, which are arranged at the axially opposite ends of the support cylinder and define lateral edges of an annular seat containing the main permanent magnets. A radially outer portion of each end disc extending beyond the outer surface of the support cylinder is arranged at a non-zero axial distance from the corresponding permanent magnets.

13 Claims, 5 Drawing Sheets

(56) References Cited

U.S. PATENT DOCUMENTS

| | | | | |
|---|---|---|---|---|
| 2002/0125780 | A1* | 9/2002 | Shiratori | H02K 1/278 310/156.21 |
| 2010/0019599 | A1* | 1/2010 | Saban | H02K 1/02 310/156.12 |
| 2010/0019626 | A1* | 1/2010 | Stout | H02K 1/02 310/214 |
| 2016/0072344 | A1* | 3/2016 | Durantay | H02K 1/02 29/598 |
| 2017/0310175 | A1* | 10/2017 | Arimatsu | H02K 1/28 |
| 2017/0373548 | A1* | 12/2017 | Arimatsu | H02K 1/27 |
| 2018/0114622 | A1* | 4/2018 | Fujihara | H01F 7/0247 |
| 2019/0036401 | A1* | 1/2019 | Takano | H02K 1/20 |
| 2019/0207448 | A1* | 7/2019 | Ozasa | H02K 1/30 |
| 2021/0218322 | A1* | 7/2021 | Mihaila | H02K 1/182 |
| 2022/0029487 | A1 | 1/2022 | Sugiura et al. | |
| 2023/0118484 | A1* | 4/2023 | Sasaki | H02K 1/2733 310/156.31 |
| 2023/0188024 | A1* | 6/2023 | Tang | H02K 7/09 |
| 2023/0268814 | A1* | 8/2023 | Garrard | H02K 1/278 310/156.01 |
| 2024/0146131 | A1* | 5/2024 | Coppola | H02K 1/28 |

* cited by examiner

ROTOR FOR A ROTARY ELECTRIC MACHINE WITH END DISCS WITH PROGRESSIVELY DECREASING AXIAL DISTANCE IN BETWEEN

CROSS-REFERENCE TO RELATED APPLICATIONS

This patent application claims priority from Italian patent application no. 102023000010020 filed on May 18, 2023, the entire disclosure of which is incorporated herein by reference.

TECHNICAL FIELD

The present invention relates to a rotor for a rotary electric machine.

The present invention is advantageously applied to a rotary electric machine for automotive powering, which is installed on board a vehicle and can be utilized as a motor (absorbing electric energy and generating a mechanical driving torque) or as a generator (converting mechanical energy into electric energy).

PRIOR ART

A rotary electric machine for automotive powering comprises a shaft, which is mounted in a rotatable manner so as to rotate around a central rotation axis, a rotor which generally has permanent magnets and is fitted to the shaft so as to rotate together with said shaft, and a stator arranged around the rotor so as to enclose, on the inside, said rotor.

Patent applications EP4135164A1, DE4107602A1 and US2022029487A1 describe a rotor for a rotary electric machine and comprising: a support cylinder, which has an outer surface and a central cavity; a plurality of permanent magnets, which are axially oriented, rest on the outer surface of the support cylinder, and are arranged beside one another so as to form a closed ring; and two end discs, which are arranged at the axially opposite ends of the support cylinder and define lateral edges of an annular seat containing the main permanent magnets. A radially outer portion of each end disc extending beyond the outer surface of the support cylinder is arranged at a non-zero axial distance from the corresponding permanent magnets.

DESCRIPTION OF THE INVENTION

The object of the present invention is to provide a rotor for a rotary electric machine which has a simplified assembly of the permanent magnets in the rotor without simultaneously compromising the protection of said permanent magnets with respect to atmospheric agents.

According to the present invention, a rotor for a rotary electric machine is provided as claimed in the appended claims.

The claims describe preferred embodiments of the present invention forming integral part of the present description.

BRIEF DESCRIPTION OF THE DRAWINGS

The present invention will now be described with reference to the accompanying drawings, which illustrate a non-limiting example embodiment thereof.

PREFERRED EMBODIMENTS OF THE INVENTION

Figure 1:
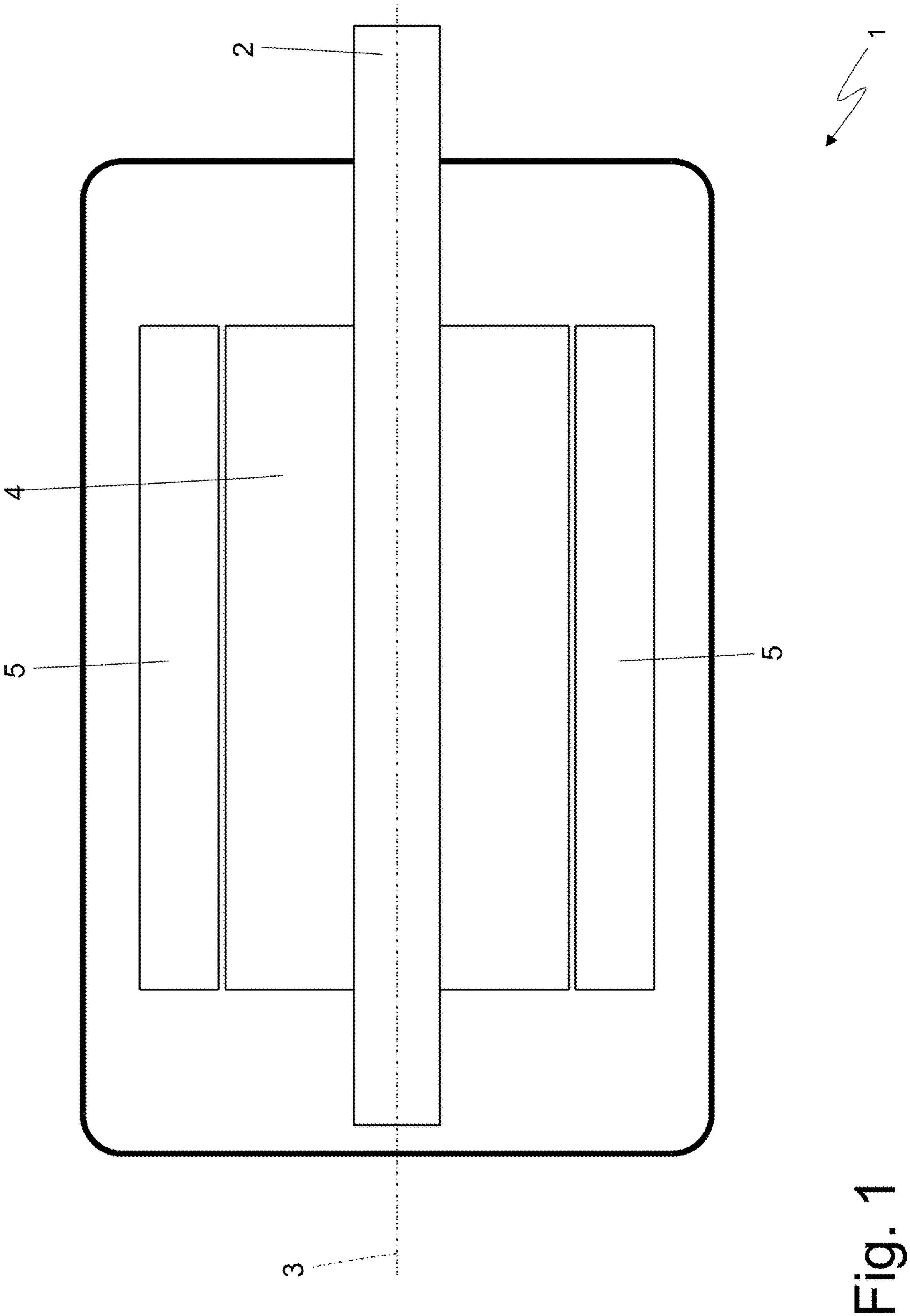
FIG. 1 is a schematic, longitudinal section view of a rotary electric machine provided with a rotor manufactured in accordance with the present invention.

In FIG. 1, reference numeral 1 indicates, as a whole, a synchronous electric machine for automotive powering of reversible type (i.e. which can operate both as an electric motor, absorbing electric energy and generating a mechanical driving torque, and as an electric generator, absorbing mechanical energy and generating electric energy).

The electric machine 1 is intended to be installed in an electric or hybrid drive vehicle comprising at least two drive wheels (namely, in an electric or hybrid drive vehicle with two drive wheels or with four drive wheels). In particular, the electric machine 1 can be connected to the drive wheels (directly or by means of a transmission possibly provided with a clutch); namely, between the electric machine 1 and the drive wheels there can be a direct connection, there can be a simple speed reducer, or there can also be a clutch.

The electric machine 1 comprises a shaft 2, which is mounted in a rotatable manner so as to rotate around a central rotation axis 3, a rotor 4 with permanent magnets which is fitted to the shaft 2 so as to rotate together with said shaft 2, and a stator 5 with a cylindrical tubular shape arranged around the rotor 4 so as to enclose, on the inside, said rotor 4.

Between the rotor 4 and the stator 5, an air gap with an annular shape is defined, which has a reduced thickness (normally the bare minimum needed in order to allow the rotation of the rotor 4 inside the stator 5 in total safety).

Figure 2:
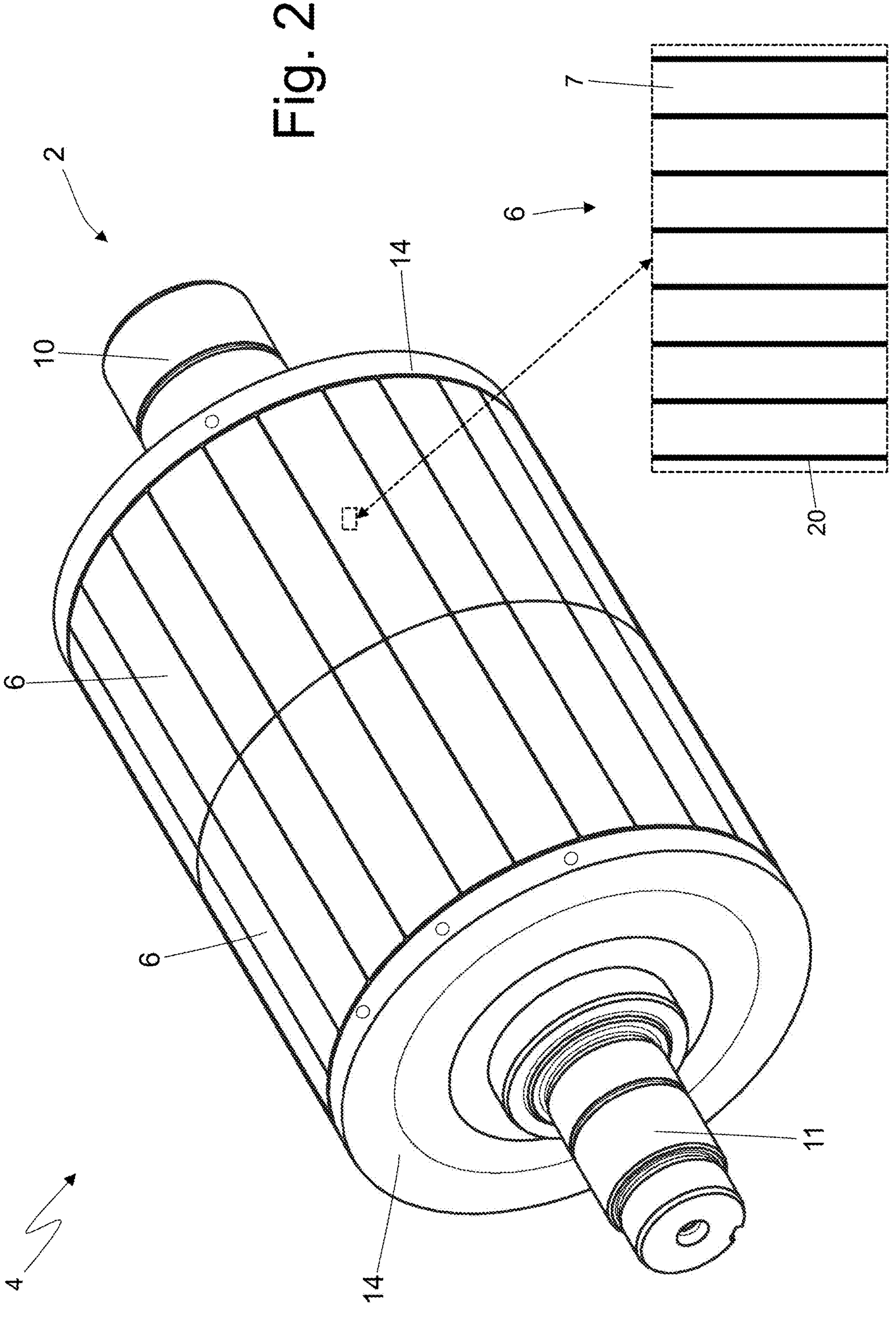
FIG. 2 is a perspective view of the rotor of FIG. 1 with some parts removed for clarity.
Figure 3:
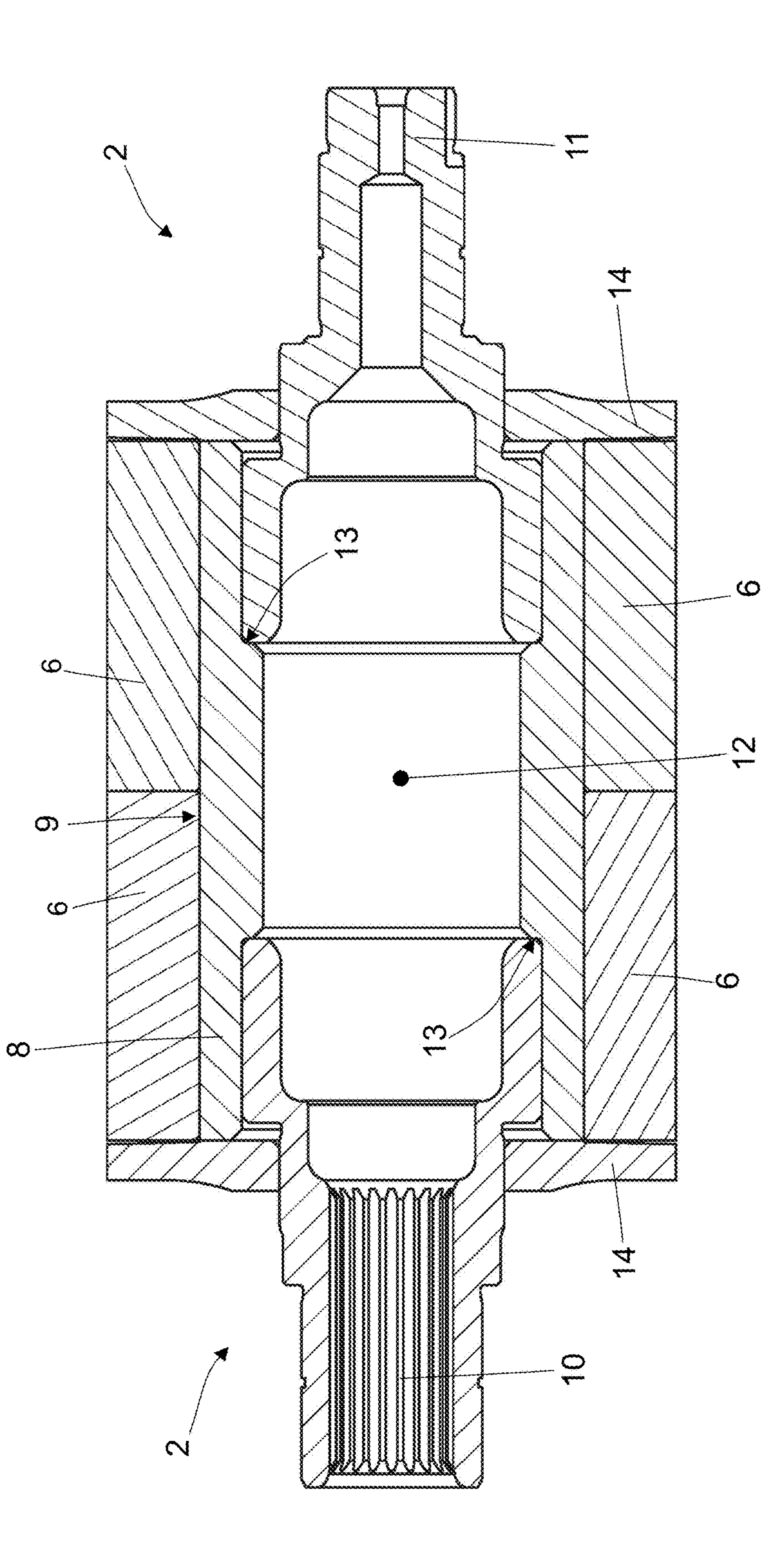
FIG. 3 is a longitudinal section view of the rotor of FIG. 1.
Figure 5:
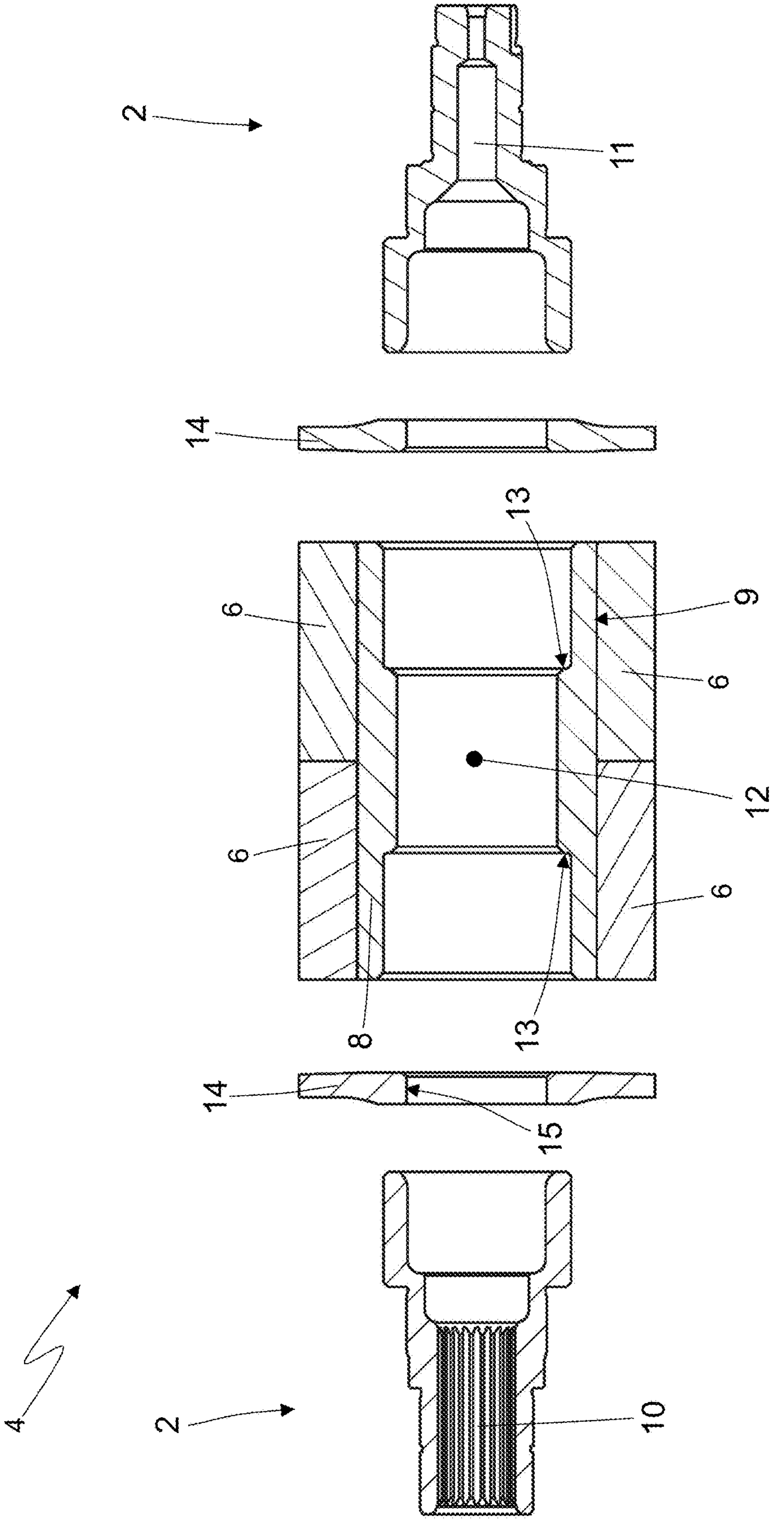
FIG. 5 is a perspective exploded view of the rotor of FIG. 1 with some parts removed for clarity.

According to what is illustrated in FIGS. 2, 3 and 5, the rotor 4 comprises a plurality of permanent magnets 6, which are axially oriented and are arranged beside one another around the rotation axis 3 so as to form a closed ring. The permanent magnets 6 have a surface arrangement, namely are arranged at the outer surface of the rotor 4 and are not inserted in recesses obtained in the rotor 4.

The sequence of permanent magnets 6 which constitutes the closed ring entails a circumferential arrangement according to a Halbach array so as to nullify the magnetic field radially on the inside of the permanent magnets 6 and so as to maximize the magnetic field radially on the outside of the permanent magnets 6. In other words, the permanent magnets 6 are arranged so as to nullify the magnetic field radially on the inside of the permanent magnets 6 (towards the shaft 2) and so as to maximize the magnetic field radially on the outside of the permanent magnets 6 (towards the magnetic core of the stator 5). Namely, the permanent magnets 6 are circumferentially arranged one following the other according to a Halbach array so as to nullify the magnetic field radially on the inside of the permanent magnets 6 and so as to maximize the magnetic field radially on the outside of the permanent magnets 6.

A Halbach array is a particular joining (arrangement) of the permanent magnets 6, which are placed so as to strengthen the magnetic field along a face of the array (the radially outermost face in the present embodiment) and simultaneously cancel (nullify) by interference the magnetic field in the opposite face (the radially innermost face in the present embodiment). The Halbach array entails cyclically repeating sets of four permanent magnets 6: a permanent magnet 6 having a South-North orientation circumferentially arranged in a clockwise direction, a following permanent magnet 6 having a South-North orientation radially arranged towards the outside (namely, moving away from the central rotation axis 3), a following permanent magnet 6 having a South-North orientation circumferentially arranged in a counterclockwise direction, and a following permanent magnet 6 having a South-North orientation radially arranged towards the inside (namely, moving close to the central rotation axis 3).

According to a different embodiment, the permanent magnets 6 are not arranged according to a Halbach array.

According to a preferred embodiment illustrated in FIG. 2, each permanent magnet 6 is not monolithic (namely, consisting from the beginning of one single piece of undivided and indivisible magnetic material), but is formed by an axial sequence of (smaller) permanent magnets 7 axially arranged in a single file one after the other, namely each permanent magnet 6 is formed by a plurality of (smaller) permanent magnets 7, which are axially arranged one after the other; in particular, in each permanent magnet 6, twenty to sixty permanent magnets 7 axially arranged in a single file one after the other are generally provided.

In each permanent magnet 6, all the permanent magnets 7 making up the permanent magnet 6 have the same identical orientation, namely are all equally oriented from the point of view of the magnetic field; in other words, in a same permanent magnet 6, the permanent magnets 7 making up the permanent magnet 6 have the magnetic field oriented in the same manner.

In the embodiment illustrated in the accompanying figures, the permanent magnets 6 alternatively have a cross section with a rectangular shape and a cross section with an isosceles trapezoidal shape; according to a different embodiment not illustrated, the permanent magnets 6 all have the same cross section with an isosceles trapezoidal shape (obviously with alternated orientations so as to make up the ring).

According to what is illustrated in FIGS. 3 and 5, the rotor 4 comprises a support cylinder 8, which houses the permanent magnets 6; in particular, the support cylinder 8 has an outer surface 9 on which the permanent magnets 6 rest. In other words, the permanent magnets 6 are arranged superficially on the outside of the support cylinder 8. According to a preferred embodiment, the outer surface 9 of the support cylinder 8 is facetted, namely is made up of a plurality of flat faces, each of which provides a flat support to a corresponding permanent magnet 6.

The support cylinder 8 is coupled to (namely constrained so as to be angularly integral with) the shaft 2 in order to form together one single cohesive block. According to a preferred embodiment, the shaft 2 consists of two half-shafts 10 and 11, each of which is separate and distant from the other and is individually coupled (fixed) to the support cylinder 8; namely, each half-shaft 10 or 11 is independent of and separate from the other half-shaft 11 or 10 and is coupled (fixed) to the support cylinder 8 independently of the other half-shaft 11 or 10 (the two half-shafts 10 and 11 do not touch each other as they are arranged at a certain distance from each other). In particular, the support cylinder 8 is internally hollow and has a central through cavity 12 into which the two half-shafts 10 and 11 are inserted. According to a preferred embodiment, each half-shaft 10 or 11 is driven through interference (in particular by means of a hot-cold coupling so as to obtain a high fastening force) into the support cylinder 8 (namely, into the central cavity 12 of the support cylinder 8).

According to a preferred embodiment, inside the central cavity 12 of the support cylinder 8 and at the two ends, two annular abutments 13 are obtained against which the corresponding half-shafts 10 and 11 rest; namely, the two annular abutments 13 constitute limit stops (of the seats) for the insertion of the half-shafts 10 and 11 into the central cavity 12 of the support cylinder 8.

The half-shaft 10 is shaped so as to be mounted on a support bearing; moreover, the half-shaft 10 is also shaped so as to be connected to a motion transmission system and thus has a spline machined surface. The half-shaft 11 is shaped so as to be mounted on another support bearing; moreover, the half-shaft 11 is also shaped so as to be connected to an angular position sensor (in particular, to a resolver).

According to what is illustrated in FIGS. 2-5, the rotor 4 comprises a pair of end discs 14 (also called balancing discs), which are arranged around the shaft 2 at the two opposite ends of the support cylinder 8 and are designed (among other things) to contain the permanent magnets 6. In other words, the two end discs 14 constitute the two opposite ends of the rotor 4 and define the lateral edges of an annular seat which contains the permanent magnets 6.

According to a possible embodiment, the end discs 14 are designed to have balancing openings, which balance the rotor 4 around the rotation axis 3 and are manufactured by means of cylindrical drilling or by means of milling. In order to allow the rotor 4 to operate at high rotation speeds while ensuring, at the same time, a long operating life, it is necessary to minimize the vibrations which are generated during the operation and which must be absorbed by the bearings that support the shaft 2. For such purpose, it is often necessary to proceed with a fine balancing of the rotor 4 so as to reduce the unbalances (due to the unavoidable constructive tolerances) which generate vibrations during the rotation. In order to allow the balancing of the rotor 4, the two end discs 14 are utilized, which act as balancers thanks to calibrated asymmetries in their mass generated by the balancing openings (which can be dead openings or through openings and can be arranged in a radial or axial manner).

Obviously, the presence, the number, the arrangement and the depth of the balancing holes are absolutely random and can completely vary from rotor 4 to rotor 4, as they depend on the actual unbalance (due to the constructive tolerances) of the rotor 4 at the end of its manufacturing. Theoretically, it is also possible for a rotor 4 to have no balancing holes at all, as, for a fortunate combination of the constructive tolerances, at the end of its manufacturing it has such a reduced unbalance around the rotation axis 3 that no corrections are required.

Each end disc 14 centrally has a through hole 15 through which a corresponding half-shaft 10 or 11 is arranged (with contact), namely each end disc 14 is fitted around a corresponding half-shaft 10 or 11, which is arranged inside the through hole 15 of the end disc 14. In other words, each end disc 14 is fitted along a corresponding half-shaft 10 or 11 through its own through hole 15 so as to come into contact with the support cylinder 8. According to a preferred embodiment, each end disc 13 is driven onto said corresponding half-shaft 10 or 11 through interference (in particular, by means of a hot-cold coupling so as to obtain a high fastening force); namely, each end disc 13 centrally has a through hole 15 into which the corresponding half-shaft 10 or 11 is inserted (by means of an interference coupling).

Each end disc 14 has a larger diameter than a diameter of the support cylinder and extends beyond the outer surface 9 of the support cylinder 8 so as to define an axial containment of the permanent magnets 6; in other words, the two end discs 14 constitute outer edges of the support cylinder 8 which protrude from the outer surface 9 of the support cylinder 8 and delimit said outer surface 9 on both sides.

According to a preferred embodiment, the end discs 14 are in axial abutment against the support cylinder 8; namely, the end discs 14 axially "touch" the support cylinder 8 and not the permanent magnets 6 so as to axially press directly against the support cylinder 8, instead of pressing against the permanent magnets 6. For such reason, the support cylinder 8 is axially (slightly, actually a few millimetres) longer than the permanent magnets 6 so as to come into contact with the end discs 14 before the permanent magnets 6.

Figure 4:
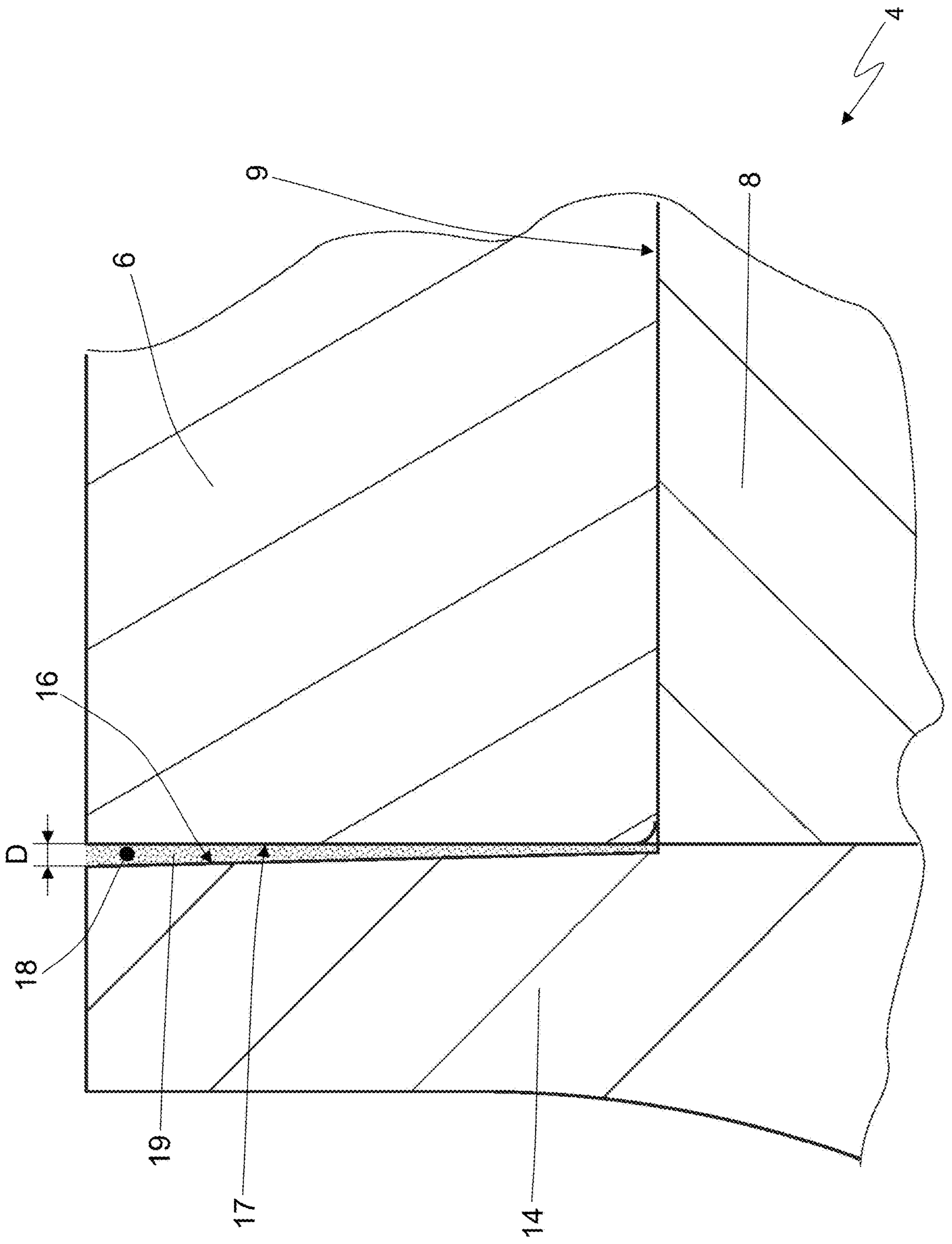
FIG. 4 is an enlarged view of a detail of FIG. 3.

According to what is better illustrated in FIG. 4, a radially outer portion of each end disc 14 extending beyond the outer surface 9 of the support cylinder 8 is arranged at a given non-zero axial distance D from the corresponding permanent magnets 6. Namely, an axially inner wall 16 of the radially outer portion of each end disc 14 is arranged at a given non-zero axial distance D from an axially outer wall 17 of the corresponding permanent magnets 6. This axial distance D between the axially inner wall 16 of the radially outer portion of each end disc 14 and the axially outer wall 17 of the corresponding permanent magnets 6 creates a space 18 that can initially be empty (when the permanent magnets 6 are radially inserted into the support cylinder 8) and is filled with a filler 19 (initially fluid and which solidifies in contact with the atmosphere), which is generally a glue or a resin. In other words, initially the permanent magnets 6 are radially inserted into the space centrally delimited by the outer surface 9 of the support cylinder 8 and laterally delimited by the axially inner walls 16 of the two end discs 14; subsequently (i.e. after inserting all the permanent magnets 6) the space 18 that initially remains empty is filled (and thus totally closed) with the filler 19.

According to what is illustrated in FIG. 4, the axial distance D is not constant but progressively decreases (linearly) from the outside to the inside (i.e. progressively decreases towards the rotation axis 3) and thus gives the space 18 a (truncated) "V" shape.

The rotor 4 comprises a cylindrical and internally hollow containment element (not illustrated), which is arranged around the permanent magnets 6 so as to keep the permanent magnets 6 in contact with the support cylinder 8; namely, the containment element covers the permanent magnets 6 externally so as to provide a radial containment of said permanent magnets 6 in order to prevent the centrifugal force from being able to push the permanent magnets 6 against the magnetic core of the stator 5.

Generally, the half-shaft 10 is made of high-strength steel (or another equivalent material in terms of mechanical features) since it must be able to transmit the torque generated or absorbed by the rotor 4; on the other hand, the half-shaft 11 is made of steel or another metal material having a lower strength than the steel of the half-shaft 10, since the half-shaft 11 does not transmit the torque generated or absorbed by the rotor 4.

The support cylinder 8 is made of a ferromagnetic metal material (steel), of a non-magnetic metal material (such as stainless steel, aluminium, titanium or magnesium), or even of a non-metal material (typically, a composite material, such as carbon fibre, in order to have the necessary strength). As mentioned in the foregoing, the magnetic field inside the permanent magnets 6 is zero by effect of the Halbach arrangement of the permanent magnets 6 and thus the support cylinder 8 is not affected by a significant magnetic field; consequently, the support cylinder 8 does not necessarily have to have ferromagnetic properties. The support cylinder 8 made of a ferromagnetic metal material simplifies the assembly of the rotor 4, since the permanent magnets 6 adhere, by magnetic attraction, to the outer surface 9 of the support cylinder 8 and it is thus easier to arrange them on the outer surface 9 of the support cylinder 8 during the assembly.

The end discs 14 are normally made of non-magnetic stainless steel so as to have the necessary strength, so as to allow the correct balancing of the rotor 4 (the end discs 14 must have a certain mass in order to be able to produce an effective balancing action by effect of the removal of material from said end discs 14) and, at the same time, so as not to disturb the magnetic field generated by the permanent magnets 6.

According to a possible embodiment illustrated in FIG. 2, in each permanent magnet 6, the single permanent magnets 7 are glued to one another by means of the interposition of an assembly glue 20 (which constitutes an electrical insulator) so as to reduce energy losses due to eddy currents. In other words, each permanent magnet 6 is manufactured by gluing the single permanent magnets 7 to one another by means of the assembly glue 20 (which constitutes an electrical insulator).

According to a preferred embodiment, the permanent magnets 6 are directly mounted on the outer surface 9 of the support cylinder 8; in particular, each permanent magnet 6 is glued to the outer wall 9 of the support cylinder 8 by means of an assembly glue, which is preferably an electrical insulator (so as to avoid "short-circuiting" the various permanent magnets 7 of a same permanent magnet 6 through the outer wall 9 of the support cylinder 8). In other words, an electrically insulating layer consisting of the assembly glue is interposed between the outer wall 9 of the support cylinder 8 and the permanent magnets 6.

The assembly glue has the function of electrically insulating the permanent magnets 6 from the underlying outer wall 9 of the support cylinder 8 and above all of connecting the permanent magnets 6 to the outer wall 9 of the support cylinder 8 during the construction of the rotor 4 (the mechanical restraint of the permanent magnets 6 is produced by the containment element, since the assembly glue is not capable of withstanding the centrifugal force when the rotor 4 rotates at high speed).

The embodiments described herein can be combined with one another without departing from the scope of protection of the present invention.

The rotor 4 described above has numerous advantages.

Firstly, the rotor 4 described above allows mounting the permanent magnets 6 on the support cylinder 8 in a very simple manner since it allows inserting the permanent magnets 6 with a radial movement and without any effort thanks to the existing axial distance D between the end discs 14 and the permanent magnets 6. In other words, the permanent magnets 6 being rested with a radial movement against the outer surface 9 of the support cylinder 8 do not "rub" against the end discs 14 thanks to the axial distance D and therefore their radial insertion does not involve any effort.

The fact that during the coupling of the permanent magnets 8 to the outer surface 9 of the support cylinder 8, said permanent magnets 8 do not rub against the end discs 14 allows preventing the assembly glue 20 located on the axially outer wall 17 of the permanent magnets 8 from being removed (scraped off) by the end discs 14 and therefore allows it to remain in position; in fact, it is important that the assembly glue 20 located on the axially outer wall 17 of the permanent magnets 8 is not removed since it protects the permanent magnets 8 from the oxidation caused by the contact with the oxygen present in the atmosphere.

In order to further protect the permanent magnets 8 from oxidation and give the assembly a greater compactness, the spaces 18 are filled with the filler 19, which can be the same assembly glue 20 or can be a resin or a glue of a different type.

The flared (i.e. "V") shape of the spaces 18 performs a self-centring function, which facilitates the correct axial positioning of the permanent magnets 8 when they rest on the outer surface 9 of the support cylinder 8.

Finally, the rotor 4 described above is easy to manufacture since it is composed of a reduced number of simply shaped pieces that can be quickly combined with one another also in automated processes.

LIST OF THE REFERENCE NUMBERS OF THE FIGURES

1 electric machine
2 shaft
3 rotation axis
4 rotor
5 stator
6 permanent magnets
7 permanent magnets
8 support cylinder
9 outer surface
10 half-shaft
11 half-shaft
12 central cavity
13 annular abutments
14 end disc
15 through hole
16 axially inner wall
17 axially outer wall
18 space
19 filler
20 assembly glue
D axial distance

The invention claimed is:

1. A rotor (4) for a rotary electric machine (1) and comprising:

a support cylinder (8), which has an outer surface (9) and a central cavity (12);

a plurality of main permanent magnets (6), which are axially oriented, rest on the outer surface (9) of the support cylinder (8) and are arranged beside one another around a rotation axis (3) to form a closed ring; and two end discs (14), which are arranged at the axially opposite ends of the support cylinder (8) and define lateral edges of an annular seat containing the main permanent magnets (6);

wherein a radially outer portion of each end disc (14) extending beyond the outer surface (9) of the support cylinder (8) is arranged at a non-zero axial distance from the corresponding main permanent magnets (6);

wherein the axial distance (D) is not constant and progressively decreases from the outside to the inside.

2. The rotor (4) according to claim 1, wherein an axially inner wall (16) of the radially outer portion of each end disc (14) is arranged at the non-zero axial distance (D) from an axially outer wall (17) of the corresponding permanent magnets (6).

3. The rotor (4) according to claim 1, wherein the axial distance (D) decreases linearly from the outside to the inside.

4. The rotor (4) according to claim 1, wherein the end discs (14) have respective balancing openings, which balance the rotor (4) around the rotation axis (3).

5. The rotor (4) according to claim 1, wherein each main permanent magnet (6) consists of a plurality of smaller secondary permanent magnets (7), which are axially arranged one following the other.

6. The rotor (4) according to claim 1, wherein a space (18) that has a truncated "V" shape is defined between the radially outer portion of each end disc (14) and the corresponding permanent magnets (6).

7. The rotor (4) according to claim 6, wherein the space (18) is occupied by a filler (19).

8. The rotor (4) according to claim 1, wherein the main permanent magnets (6) are circumferentially arranged one following the other according to a Halbach array so as to nullify the magnetic field radially on the inside of the main permanent magnets (6) and so as to maximize the magnetic field radially on the outside of the main permanent magnets (6).

9. The rotor (4) according to claim 8, wherein;

the Halbach array entails cyclically repeating sets of four said main permanent magnets (6);

each set of four said main permanent magnets (6) comprises: a first main permanent magnet (6) having a South-North orientation circumferentially arranged in a clockwise direction, a following second main permanent magnet (6) having a South-North orientation radially arranged towards the outside, a following third main permanent magnet (6) having a South-North orientation circumferentially arranged in a counterclockwise direction, and a following fourth main permanent magnet (6) having a South-North orientation radially arranged towards the inside.

10. The rotor (4) according to claim 1 and comprising two half-shafts (10, 11), which are independent of and separate from each other and are singularly inserted into opposite ends of the central cavity (12) of the support cylinder (8) so as to form one single block with the support cylinder (8).

11. The rotor (4) according to claim 10, wherein each half-shaft (10, 11) is driven into the central cavity (12) of the support cylinder (8) through interference.

12. The rotor (4) according to claim 11, wherein the central cavity (12) of the support cylinder (8) has two annular abutments (13), against which the corresponding half-shafts (10, 11) rest.

13. The rotor (4) according to claim 10, wherein each end disc (14) is fitted around a corresponding half-shaft (10, 11) and is driven onto the half-shaft (10, 11) through interference.

* * * * *